United States Patent [19]
Izuchi et al.

[11] Patent Number: 5,290,592
[45] Date of Patent: Mar. 1, 1994

[54] MANUFACTURING METHOD FOR ELECTRODE

[75] Inventors: Syuichi Izuchi; Tomohiko Noda; Youetsu Yoshihisa; Shiro Kato; Kenichi Takeuchi; Hiromistu Mishima, all of Takatsuki, Japan

[73] Assignee: Yuasa Battery Co., Ltd., Osaka, Japan

[21] Appl. No.: 653,328

[22] Filed: Feb. 11, 1991

[30] Foreign Application Priority Data

Feb. 13, 1990 [JP] Japan ................................. 2-33104
Jun. 8, 1990 [JP] Japan ................................. 2-151191
Aug. 22, 1990 [JP] Japan ................................. 2-221686

[51] Int. Cl.$^5$ ............................................. B05D 1/36
[52] U.S. Cl. ................................. 427/203; 205/59; 427/122; 427/124; 427/126.1; 427/180; 427/249; 427/250; 427/255.3; 427/255.7; 427/343; 427/404; 427/430.1; 427/419.2
[58] Field of Search ............... 427/180, 249, 255.3, 427/203, 122, 124, 126.3, 250, 255.7, 343, 430.1, 404, 419.2; 205/59

[56] References Cited

U.S. PATENT DOCUMENTS 4,236,991 12/1980 Backhurst et al. .
4,959,242 9/1990 Itoh ......................................... 427/38

FOREIGN PATENT DOCUMENTS 1-265450 10/1989 Japan .
WO8503460 8/1985 PCT Int'l Appl. .

OTHER PUBLICATIONS

Patent Abstracts of Japan, vol. 14, No. 537, Nov. 27, 1990.
Patent Abstracts of Japan, vol. 8, No. 181, Aug. 21, 1984.
Japanese Journal of Applied Physics 23, L910, 1984 S. Kashu et al., "Deposition of Ultra Fine Particles Using a Gas Jet".
Journal of the Surface Science Society of Japan, 8, 335, 1987 M. Oda, "Preparation of Ultra Fine Particles with Gas Evaporation Method and Their Application".
Applied Physics, 54, 687, 1985 C. Hayashi, "Gas Deposition of Ultra Fine Particles".

Primary Examiner—Bernard Pianalto
Attorney, Agent, or Firm—Armstrong, Westerman, Hattori, McLeland & Naughton

[57] ABSTRACT

A manufacturing method for an electrode in which ultra fine particles of active material formed in gas by an evaporation method are carried in a gas flow and blown onto a surface of a substrate, so that an electrode comprising a thin film of active material is formed on the surface of the substrate. A manufacturing method for an electrode-electrolyte composite in which ultra fine particles of active material formed in gas by the evaporation method are carried in a gas flow and blown onto a surface of a film comprising a solid electrolyte, so that an electrode comprising a thin film of active material is formed on the surface of the film. The above manufacturing method for an electrode can provide an anode or a cathode comprising an ultra thin film having an uniform thickness of under 10 microns inclusive, for example. The above manufacturing method for an electrode-electrolyte composite can provide, with good productivity, an electrode-electrolyte composite in which an adhesion of the electrode with the electrolyte is excellent and the electrode is of an ultra thin type having an uniform thickness.

35 Claims, 7 Drawing Sheets

MANUFACTURING METHOD FOR ELECTRODE

BACKGROUND ART

1. Industrial Useful Field

This invention relates to a manufacturing method for an electrode for use in a film type battery and a manufacturing method for an electrode-electrolyte composite.

2. Prior Art and its Problem

A conventional cathode for a film type battery has been manufactured as a sheet-shaped thin film by mixing conductor, binder and positive active material. In this method, however, a thickness of the thin film has been dependent on a particle size and a charging rate of the positive active material. It has been hard to obtain a sub-micron particle size and it has been difficult to increase the charging rate, so that it has been not easy to obtain a thin film having a thickness of under 10 microns inclusive.

Methods of utilizing lithium or lithium alloy for an anode have been proposed variously, however, it has been difficult to obtain a thin film of uniform thickness composed of lithium. In a method for manufacturing a thin film by extruding lithium from a nozzle for example, a lower limit of thickness of the thin film has been 0.03 mm, and the thickness has become not uniform under this thickness. Further, in a method for obtaining a thin film by rolling, a lower limit of thickness of the thin film has been 0.02 to 0.03 mm.

Carbon electrodes have been manufactured as a sheet-shaped thin film by mixing a carbon material and a binder. However, a thickness of the sheet has been dependent on a charging rate of carbon material, and it has been difficult to obtain a thin film electrode having a thickness of under 10 microns inclusive.

As described above, in the conventional method it has been difficult to obtain an anode or a cathode composed of an ultra thin film having an uniform thickness of under 10 microns inclusive, for example, with good productivity.

Methods for manufacturing the thin film electrode by means of a vacuum coating method, sputtering method etc. have been proposed. In these methods, however, a film forming rate is small so that the method is suitable for forming a film having a thickness of less than several hundred angstroms but not suitable for forming a film having a thickness of larger than that. On the other hand, in order to improve the film forming rate, a method wherein ultra fine particles of metal are directly carried in a gas flow to be deposited on a substrate at a high velocity has been proposed in Published Patent Application (KOKAI) No. 1-265450. However, this method has included such a disadvantage of an incontinuous and inefficient film forming process. Obtaining active materials of a multi-component system by this method has provided poor productivity because of the expense of fine-particles of various metals and the difficulty in mixing them uniformly. Moreover, it has been impossible to obtain active matrials of a multi-component system having an excellent property by this method.

In recent years, study and development of a secondary lithium battery are flourishing. Using metallic lithium for the anode in the secondary lithium battery will cause troubles from the standpoint of deterioration of performance and safety accompanied by dendrite formation at the time of charging. In order to overcome this problem, it has been proposed to use a carbon capable of occlusion and emission of lithium as the anode material. In a lithium battery utilizing a normal lithium intercalation active material as the cathode and a carbon electrode as the anode, it is necessary to previously dope the lithium in the carbon electrode. For this reason, the carbon electrode has required a troublesome process named as a doping process before assembling a package. In order to eliminate the previous doping process for the carbon electrode, it can be proposed that an active material having a structure reduced by lithium is synthesized to be used as the cathode active material. The manufacturing process can be simplified by this method. For example, $LiMn_2O_4$ which is a spinel related lithium manganese oxide compound, is one which can be used as the cathode active material for a secondary lithium battery and can be synthesized easily. It is well known that a state of the cathode active material at the charging end will change up to $Li_2Mn_2O_4$ when the battery is assembled by using the above material together with lithium related anode material and is discharged. Accordingly, if the spinel related manganese compound expressed by the chemical formula of $Li_2Mn_2O_4$ can be synthesized, the secondary lithium battery can be composed by combining that compound and the carbon electrode which is not doped yet. In the present situation, however, it requires further various studies to chemically synthesize the lithium reductant called $Li_2Mn_2O_4$, and a process named as previous discharging becomes necessary in order to synthesize the reductant electro-chemically. In order to eliminate the previous doping process for the carbon electrode, it can also be proposed to form a carbon electrode in which lithium has been doped previously.

On the other hand, it is desired to use a solid electrolyte, especially a solid polymer electrolyte, as an ionic conductive material for use in the film type battery. This is because the solid electrolyte has advantages of easiness in manufacturing, freeness from liquid leakage, and capability of manufacturing cells having voluntary shapes. When using the solid electrolyte, however, means for always maintaining a good adhesion state between the electrode and electrolyte, i.e. pressure welding of the two etc., will be required. With the film type battery, especially a battery provided with flexibility, it is difficult to apply a pressure from outside or inside as encountered in a prismatic battery or a spiral cylindrical battery, so that a serious trouble such as failure in adhesion between the electrode and electrolyte occurs.

In addition to the foregoing improvement in good adhesion between the electrode and electrolyte, the following points are required: [1] An effective contacting area between an electrode material and a packaging material which forms a current collector must be maintained in a good state. [2] In case of an organic electrolyte battery such as the lithium battery etc., it must be protected from influence of water content because a composite composed of the electrode and the electrolyte reacts with the water content to become an undesirable material for a battery.

Further, the following literatures are known as the prior art: [1] "Surface Technology" 8, 335, 1987, M. Oda, 'Formation and Application of Ultra Fine particles by In-Gas Evaporation Method', [2] "Applied Physics" 54, 687, 1985, C. Hayashi, 'Gas Deposition of Ultra Fine Particles', [3] "Japanese Journal of Applied Physics" 23, L910, 1984, S. Kashu, E. Fuchita, T. Manabe, C. Hayashi, 'Deposition of Ultra Fine Particles Using a Gas Jet'.

SUMMARY OF THE INVENTION

Objects of the invention are to provide manufacturing methods for an electrode and manufacturing methods for an electrode-electrolyte composite, as described below.

In the first place, an object of this invention is to provide a manufacturing method for an electrode capable of producing an anode or a cathode with good productivity, which is composed of an ultra thin film having an uniform thickness of under 10 microns inclusive, for example.

In the second place, an object of this invention is to provide a manufacturing method for an electrode capable of producing an electrode with good productivity, which is composed of an active material of a multi-component system, has an uniform composition of high density and is composed of an ultra thin film having an uniform thickness.

In the third place, an object of this invention is to provide a manufacturing method for an electrode capable of producing an ultra thin electrode for a lithium battery with good productivity, which has an excellent volume efficiency and an uniform thickness.

In the fourth place, an object of this invention is to provide a manufacturing method for an electrode-electrolyte composite capable of producing an ultra thin electrode-electrolyte composite, with good productivity, in which an adhesion between the electrode and the electrolyte is excellent and the electrode is of an ultra thin type having an uniform thickness.

In the fifth place, an object of this invention is to provide a manufacturing method for an electrode-electrolyte composite capable of producing the electrode-electrolyte composite as described above, which includes a sufficient perforated contacting area with a packaging material and is free from poor influence of water content in atmosphere.

In order to accomplish the first object, the present invention provides a manufacturing method for an electrode, in which ultra fine particles of an active material formed in gas by the evaporation method are carried by gas flow to be blown onto a surface of the substrate so that an electrode composed of a thin film of the active material is formed on the surface of the substrate. The invention further provides a manufacturing method, in which ultra fine particles of pure metal formed in gas by the evaporation method are made to react with a reaction gas mixed in gas to form ultra fine particles of active material, and the ultra fine particles of that active material are carried by gas flow to be blown onto a surface of a substrate so that an electrode composed of a thin film of the active material is formed on the surface of the substrate. The invention still further provides a manufacturing method, in which ultra fine particles of carbon material are carried by gas flow to be blown onto a surface of an electrode so that a carbon electrode composed of a thin film of carbon material is formed on the surface of the substrate.

In order to accomplish the second object, the present invention provides a manufacturing method for an electrode, in which ultra fine particles of metals of various kinds are formed in gas by the evaporation method, the ultra fine particles are carried by gas flow to be blown onto a surface of a substrate to form a thin film, the thin film is made to react with oxygen while being heated to form the active material of a multi-component system so that an electrode composed of a thin film of active material is formed on the surface of the substrate. The invention further provides a manufacturing method for an electrode, in which ultra fine particles of metals of various kinds are formed in gas by the evaporation method, the ultra fine particles are made to react with oxygen mixed in the gas and then blown onto a surface of the substrate to form an electrode composed of a thin film of active material of a multi-component system on the surface of the substrate.

In order to accomplish the third object, the present invention provides a manufacturing method for an electrode, in which ultra fine particles of a metal compound and ultra fine particles of lithium are carried by gas flow to be blown simultaneously onto a surface of the same substrate and deposited on it respectively, so that a cathode for a lithium battery is formed on the surface of the substrate. The invention further provides a manufacturing method for an electrode, in which ultra fine particles of metal compound and ultra fine particles of lithium are carried by gas flow to be blown simultaneously onto a surface of the same substrate and deposited on it respectively, and that deposit is dipped in a liquid electrolyte to be made to react electro-chemically, so that a cathode for a lithium battery is formed on the surface of the substrate. The invention still further provides a manufacturing method for an electrode, in which ultra fine particles of carbon material and ultra fine particles of lithium are carried by gas flow to be blown simultaneously onto a surface of the same substrate and deposited on it respectively, so that a cathode for a lithium battery composed of a carbon-lithium compound is formed on the surface of substrate.

In order to accomplish the fourth object, the present invention provides a manufacturing method for an electrode-electrolyte composite, in which ultra fine particles of active material formed in gas by the evaporation method are carried by gas flow to be blown onto a surface of a film composed of a solid electrolyte so that an electrode composed of a thin film of active material is formed on the film surface. The invention further provides a manufacturing method, in which ultra fine particles of active material formed in gas by the evaporation method are carried by gas flow to be blown onto the surface of a film composed of the solid electrolyte so that an electrode composed of a thin film of active material is formed on the film surface, and a positive active material is blown onto one surface of the film and a negative active material is blown onto the other surface of it. The invention still further provides a manufacturing method, in which ultra fine particles of pure metal formed in gas by the evaporation method are made to react with a reaction gas mixed in gas to form ultra fine particles of active material, and the ultra fine particles of active material are carried by gas flow to be blown onto a surface of a film composed of a solid electrolyte so that an electrode composed of a thin film of active material is formed on the surface of the film.

In order to accomplish the fifth object, the present invention provides a manufacturing method for an electrode-electrolyte composite, in which ultra fine particles of active material formed in gas by the evaporation method are carried by gas flow to be blown onto a surface of a film composed of a solid electrolyte so that an electrode composed of a thin film of active material is formed on the surface of the film, and ultra fine particles of metal of a type different from the active material and formed by the evaporation method are carried by gas to be blown onto a surface of an electrode so that a metal film is formed on the surface of the electrode. The invention further provides a manufacturing method, in which ultra fine particles of active material formed in gas by the evaporation method are carried by gas flow to be blown onto the surface of a film so that an electrode composed of a thin film of active material is formed on the surface of the film, ultra fine particles of metal of a type different from the active material and formed by the evaporation method are carried by gas to be blown onto a surface of an electrode so that a metal film is formed on the surface of the electrode, and a positive active material is blown onto one surface of the film and a negative active material is blown onto the other surface thereof.

EMBODIMENTS

Embodiment 1

This embodiment relates to a manufacturing method for a cathode comprising manganese dioxide.

Figure 1:
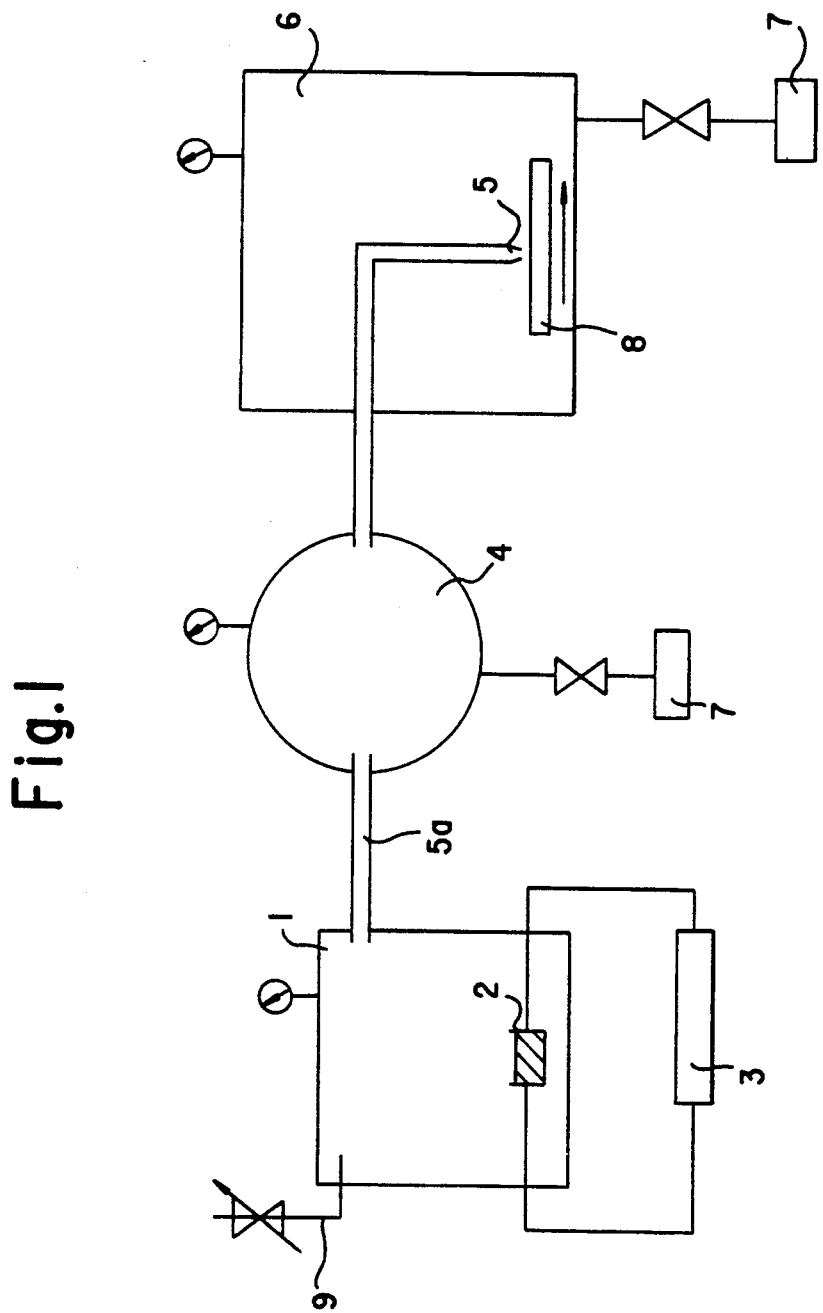
FIG. 1 is a schematic view showing a fundamental composition of a manufacturing device for use in embodiments 1, 2, 3, 9, 10, 11, 12 and 13.

FIG. 1 is the schematic view of a manufacturing device. In this figure, 1 is an evaporation chamber, 2 is a crucible, 3 is a heater, 4 is a differential pumping chamber, 5 is a nozzle at tip end of a delivery pipe 5a, 6 is a spray chamber, 7 is a vacuum pump, 8 is a substrate made of stainless foil, and 9 is a lead-in pipe for supply gas. Inert gas, helium (gas is used therefor in this embodiment,) is used for the supply gas. A size of tip end opening of the nozzle 5 is 0.8 mm×10 mm. A high frequency induction heater is used for the heater 3.

First, in the evaporation chamber 1, manganese dioxide placed in the crucible 2 was converted into vapor by being heated, molten and vaporized in the heater 3 under an atmosphere of helium gas so as to form ultra fine particles of manganese dioxide composed of the vapor condensing to sizes of 0.1 to 0.3 microns. After setting a pressure of helium gas in the evaporation chamber 1 to 100 torr and a pressure in the spray chamber 6 to 0.12 torr, the ultra fine particles of manganese dioxide were carried by helium gas flow to be induced to the nozzle 5 through the delivery pipe 5a, and then blown from the nozzle 5 onto a surface of the substrate 8 installed in the spray chamber 6. Thereby, a film of manganese dioxide having a width of 10 mm, a length of 10 mm and a thickness of 10 microns, i.e. a cathode composed of manganese dioxide, was formed on the surface of the substrate 8. This film is one obtained by injecting and depositing the ultra fine particles of manganese dioxide, i.e. by means of the gas deposition method, so that this film is rigid and can not be obtained by an ordinary sheeting method. Further, the above-mentioned method is of a dry type and pure so that it does not require a binder.

According to the above-mentioned method as described above, the cathode of manganese dioxide composed of an ultra thin film having an uniform thickness can be produced with good productivity.

Incidentally, it appears that the electrode generally has a better volume energy efficiency with a decrease in porosity (an increase in charging efficiency). In order to have it function as an electrode, however, the material of an electrode should properly be in contact with the electrolyte so as to provide efficient occlusion and emission of ion in the electrolyte. Therefore, the electrode should be formed so as to include a proper porosity. According to the above-mentioned method, an electrode having a voluntary porosity can be produced by continuously adjusting a blowing velocity of the active material onto the substrate 8.

There may be a case where the differential pumping chamber 4 is not used.

Embodiment 2

This embodiment relates to a manufacturing method for an anode comprising lithium.

In the device shown in FIG. 1, lithium was placed in the crucible 2 in place of the manganese dioxide and a resistance heater was used in place of the heater 3, and the same operation as the embodiment 1 was carried out under the same condition as that. Thereby, a film of lithium having a width of 10 mm, a length of 10 mm and a thickness of 10 microns, i.e. an anode composed of lithium, was formed on the surface of the substrate 8. This film is one obtained by injecting and depositing the ultra fine particles of lithium, i.e. by means of the gas deposition method, and this film is one which can not be obtained by an ordinary melting, solidifying, or rolling method.

According to the above-mentioned method as described above, the anode of lithium composed of an ultra thin film having an uniform thickness can be produced with good productivity. Further, an electrode having a voluntary porosity can be produced by continuously adjusting the blowing velocity of the active material.

There may be a case where the differential pumping chamber 4 is not used. Moreover, when a lithium alloy is used in place of the foregoing lithium, an anode comprising lithium alloy can be formed.

Embodiment 3

This embodiment relates to a manufacturing method for a cathode comprising manganese dioxide, and relates to a method different from that described in the embodiment 1.

Referring to the device shown in FIG. 1; in the evaporation chamber 1, the manganese placed in the crucible 2 was converted into vapor by being heated, molten and vaporized in the high frequency induction heater 3 under an atmosphere of mixed gas of helium and oxide so as to form ultra fine particles of manganese composed of the vapor condensing to sizes of 0.1 to 0.3 microns. The ultra fine particles of manganese formed as above react with oxygen to become ultra fine particles of manganese dioxide. After setting a pressure of the mixed gas in the evaporation chamber 1 to 100 torr and a pressure in the spray chamber were carried by mixed gas flow to be led to the nozzle 5 through the delivery pipe 5a, and then blown from the nozzle 5 onto a surface of the substrate 8 installed in the spray chamber 6. Thereby, a coating film having a width of 10 mm, a length of 10 mm and a thickness of 10 microns was formed on the surface of the substrate 8. This coating film was identified as $MnO_2$ when measured by the X-ray diffraction method. Namely, a film of manganese dioxide i.e. the anode composed of manganese dioxide was formed on the surface of the substrate 8. This film is one obtained by injecting and depositing the ultra fine particles of manganese dioxide, i.e. by means of the gas deposition method, and this film is rigid and can not be obtained by an ordinary chemical synthesizing method or a sheeting method. Further, the above-mentioned method is of a dry type and pure so that it does not require a binder.

According to the above-mentioned method as described above, the cathode of manganese dioxide composed of an ultra thin film having an uniform thickness can be produced with good productivity. Further, an electrode having a voluntary porosity can be produced by continuously adjusting the blowing velocity of the active material.

Moreover, when vanadium, molybdenum, titanium, cobalt, or chrome etc. is used in place of the foregoing manganese, a cathode comprising active material which is an oxide of the above material can be formed.

Embodiment 4

This embodiment relates to a manufacturing method for a carbon electrode.

Figure 2:
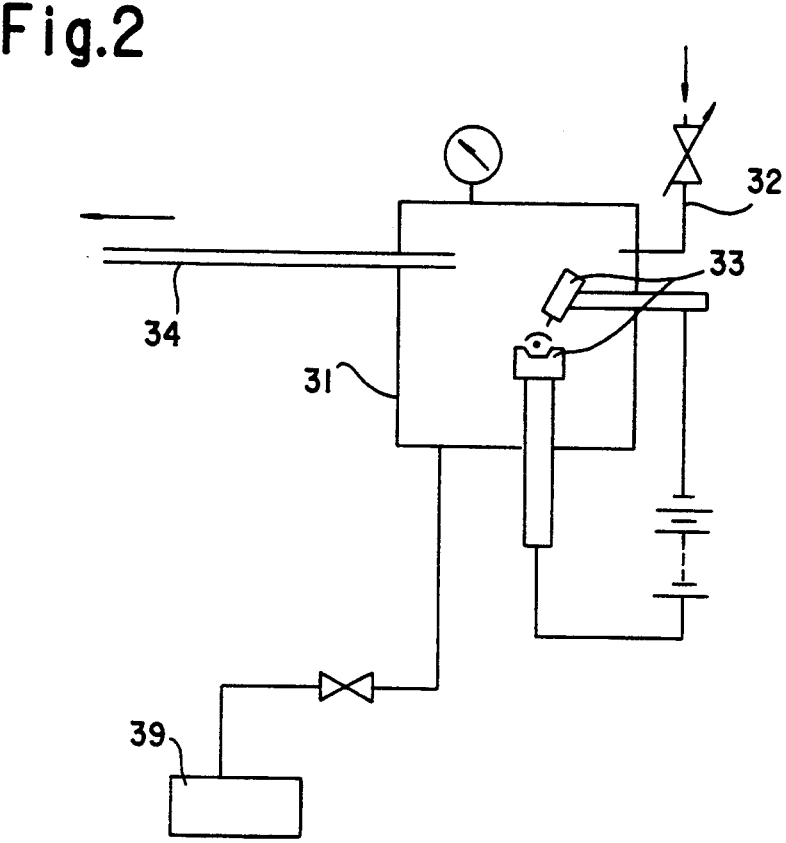
FIGS. 2 and 3 are schematic views showing a fundamental composition of a manufacturing device for use in an embodiment 4.
Figure 3:
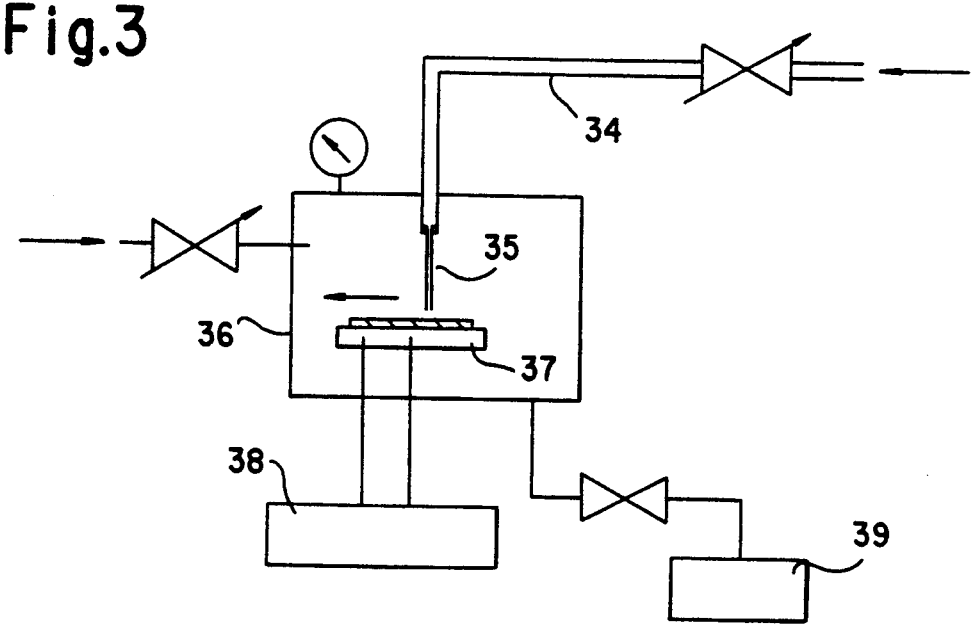

FIG. 2 and FIG. 3 are schematic views of a manufacturing device. In the figures, 31 is an evaportion chamber, 32 is a lead-in pipe which leads carrier gas into the evaporation chamber 31, 33 is an arc electrode, 34 is a delivery pipe, 35 is a nozzle having a tip end opening size of 0.8 mm × 10 mm, 36 is a spray chamber, 37 is a substrate composed of stainless foil, 38 is a heater power supply for heating the substrate 37, and 39 is a pump. A carbon with high purity was used for the arc electrode, and methane gas was used for the carrier gas.

Arc discharge was generated between the arc electrodes 33 in the evaporation chamber 31 to form ultra fine particles of carbon. The fine particles were carried by methane gas which was led in from the led-in pipe 32, led to the nozzle 35 through the delivery pipe 34, and blown onto the surface of the substrate 37 from the nozzle 35 within the spray chamber 36. Thereby, a rigid carbon film having a width of 10 mm, a length of 10 mm and a thickness of 10 microns was obtained. This film is one which can not be obtained by the conventional sheeting method and requires no binder.

As described above, the carbon electrode composed of ultra thin film having an uniform thickness can be obtained by the foregoing method with good productivity.

A spacing measured by the X-ray diffraction of the electrode thus obtained was 3.45. Incidentally, it appears that the carbon electrode generally has a better volume energy efficiency with a decrease in porosity (an increase in charging density). In order to have it function as the electrode, however, the material of the electrode should properly be in contact with the electrolyte so as to provide efficient transfer of ions through the interface between the electrode and the electrolyte. Therefore, it is required to use an electrode having a proper porosity, and the above-mentioned method will provide the electrode having a voluntary porosity by consecutively adjusting the blowing velocity onto the substrate. The reason why a crystal of the formed carbon material has a pseudo-graphite structure having a spacing of more than 3.3 inclusive, is as follows. A perfect graphite structure means a structure in which two-dimensionally repeated perfect six-membered rings of carbon are stacked one on the other in a vertical direction, and its chemical composition is expressed by C. A distance between vertically stacked structures is called spacing, and a spacing of the perfect graphite structure is 3.354 and a value smaller than this can not exist. On the contrary, when —H group or other various groups are attached to carbon atom, the spacing will become larger than that of the perfect graphite. Giving consideration to an application of this structure to a battery material using lithium ion as its medium, for instance, the perfect graphite is not preferable to a graphitic structure having a lithium occlusion/emission ability, but a structure having a larger spacing such as 3.4 to 3.5 is used. However, a retention ability of doped lithium lowers when the spacing becomes too large, and the graphitic substance can not maintain its structure when the spacing becomes further larger. A structure having a spacing ranging from 3.42 to 3.47 will develop the most excellent electro-chemical characteristic for the battery. On the other hand, a size of crystal (Lc) is expressed by multiplying (magnitude of spacing) by (stacked times of annular structure of graphite). When the stacked times are less than three, the crystal can not be set up and is not suitable for the battery material. Consequently, Lc of an electrode smaller than 10 angstroms can not be formed. Further, when Lc becomes larger, a crystallizability will become higher and an electro-chemical resersivility will become larger. However, when Lc exceeds 1000 angstroms, the material will become brittle and apt to rupture and will be peeled off by repeated cycles of charge/discharge. Therefore, a material having Lc of over 1000 angstroms is not suitable for the electrode, so that it is desirable to use a carbon electrode having Lc ranging from 10 to 1000 angstroms.

Figure 4:
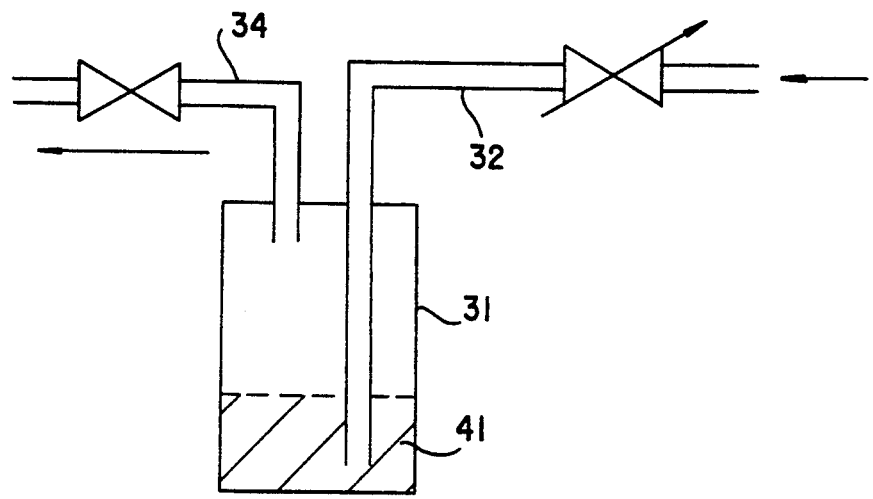
FIGS. 4 and 5 are views showing another example of a manufacturing device for use in the embodiment 4.
Figure 5:
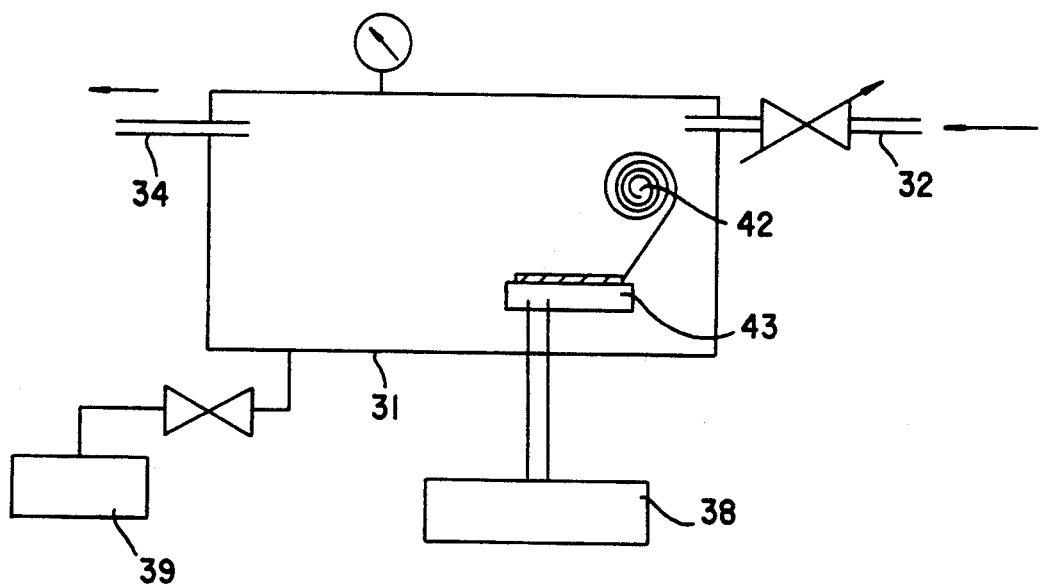

Carbon, graphite, acetylene black etc. are used for the above-mentioned carbon material. The arc discharging method is used in the foregoing embodiment for mixing the ultra fine particles of carbon material in gas flow and carrying them. However, an aerosol or other methods may be used. The arc discharging method is one in which the arc discharge is generated between two carbon electrodes and formed ultra fine particles of carbon are mixed in a gas flow and carried, as mentioned above. The aerosol method is one in which previously prepared ultra fine particles of carbon material are mixed and carried by gas flow, as shown by FIG. 4. In FIG. 4, parts having symbols which are the same as FIG. 2 represent corresponding parts, and 41 is the previously prepared ultra fine particles of carbon material. Among other methods, there is one in which an organic substance as a raw material for obtaining carbon material is supplied and subjected to treatment such as heating etc. so as to form ultra fine particles of carbon material having a structure effective for the electrode, and the ultra fine particles are mixed and carried by gas flow in succession, as shown by FIG. 5. In FIG. 5, parts having symbols which are the same as FIG. 2 represent corresponding parts, and 42 is an organic substance and 43 is a heater.

Embodiment 5

This embodiment relates to a manufacturing method for an electrode comprising active material of a multi-component system.

Figure 6:
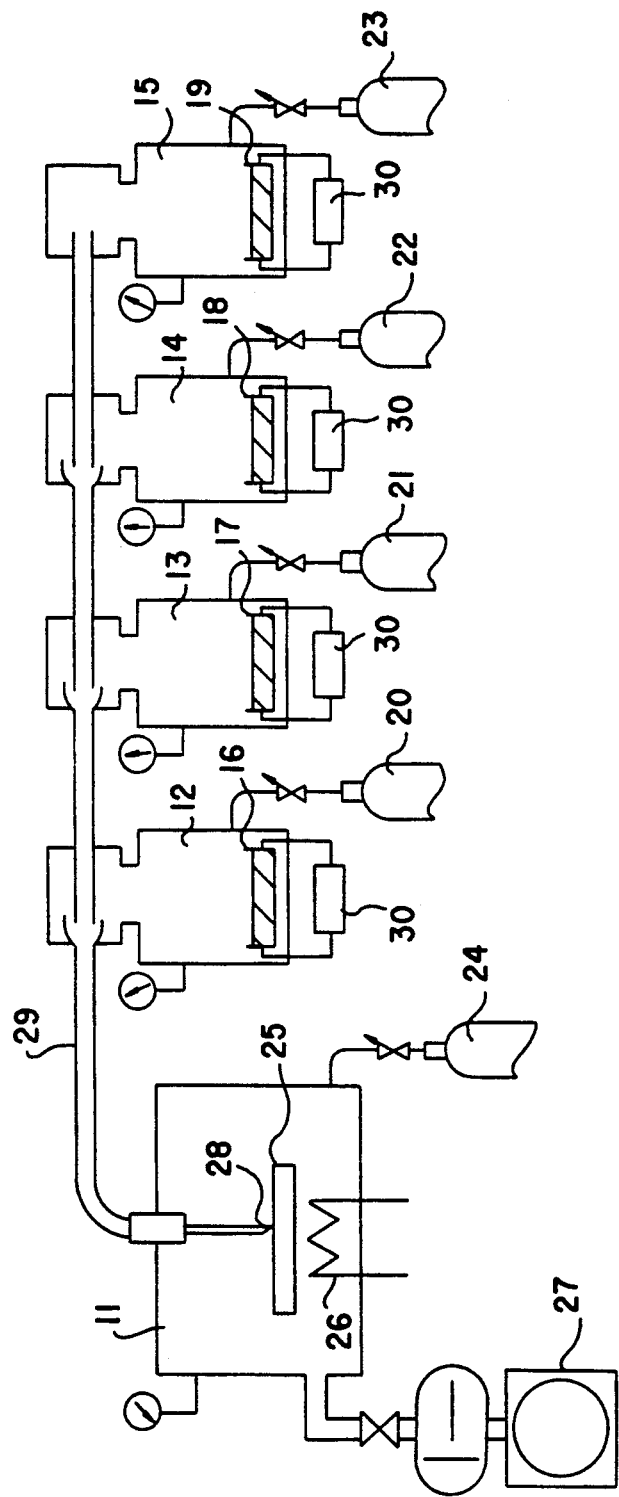
FIG. 6 is a schematic view showing a fundamental composition of a manufacturing device for use in embodiments 5 and 6.

FIG. 6 is a schematic view of a manufacturing device. In the figure; 11 is a spray chamber; 12, 13, 14 and 15 are evaporation chambers; 16, 17, 18 and 19 are crucibles; 20, 21, 22 and 23 are bombs for feeding inert gas to the evaporation chambers 12, 13, 14 and 15; 24 is a bomb for feeding oxygen gas to the spray chamber 11; 25 is a substrate composed of stainless foil; 26 is a heater; 27 is a vacuum pump; 28 is a nozzle having a tip end opening size of 0.8 mm × 10 mm; 29 is a lead-in pipe; and 30 is a high frequency induction heater. Argon gas is used for the above inert gas in this instance.

In the evaporation chambers 12, 13, 14 r& 15; lithium, vanadium, cobalt and vanadium placed in the respective crucibles 16, 17, 18 and 19 were vaporized by being heated and molten in the high frequency induction heater 30 and then cooled under an atmosphere of argon gas so as to form ultra fine particles of the respective metals. After setting pressures of the argon gas in the evaporation chambers 12, 13, 14 and 15 to 100 torr and a pressure in the spray chamber 11 to 0.12 torr, the ultra fine particles of metals formed in respective evaporation chambers 12, 13, 14 and 15 were carried by argon gas flow to be mixed while being passed through the lead-in pipe 29, and then blown from the nozzle 28 onto a surface of the substrate 25 installed in the spray chamber 11. Thereby, a film having a width of 10 mm, a length of 10 mm and a thickness of 10 microns was formed on the surface of the substrate 25. The film on the surface of the substrate 25 was heated by the heater 26 while leading oxygen gas from the bomb 24 into the spray chamber 11 so that the oxygen was made to react with the film at 700° C. This film after reaction was identified as $LiV_2CoO_8$ when measured by the X-ray diffraction method and the elemental analysis method. Namely, an electrode comprising active materials of a multi-component system was formed on the surface of the substrate 25. The above-mentioned method is of a dry type and pure so that it does not require a binder.

According to the above-mentioned method as described above, the electrode can be produced with good productivity, which is composed of the active material of a multi-component system having an excellent property and composed of an ultra thin film having a high density, an uniform composition and an uniform thickness. Further, an electrode having a voluntary porosity can be produced by continuously adjusting the blowing velocity of the active material.

Incidentally, the vaporized metal is not limited to the foregoing lithium, vanadium or cobalt; but may be selected properly from among manganese, cobalt, nickel, zinc, tin, lead, lithium, molybdenum, vanadium, chrome, iron, ruthenium, osmium, tungsten, copper or silver. Thereby, an electrode comprising various polyatomic active materials may be formed.

Embodiment 6

Operations similar to the embodiment 5 were carried out except that oxygen gas had been mixed in the spray chamber 11 before the ultra fine particles of metals were blown onto the surface of the substrate 25. In this method, ultra fine particles of metals of some kinds had become oxides before being blown onto the surface of the substrate. An electrode (same as the embodiment 4 and composed of various active materials of a multi-component system) was formed by this method too. The above-mentioned method is also of a dry type and pure so that it does not require the binder. The electrode can also be produced with good productivity, which is composed of active material of a multi-component system having an excellent property and composed of an ultra thin film having a high density, an uniform composition and an uniform thickness. Further, an electrode having a voluntary porosity can be produced by continuously adjusting the blowing velocity of the active material.

Embodiment 7

This embodiment relates to a manufacturing method for a cathode of a lithium battery.

Figure 7:
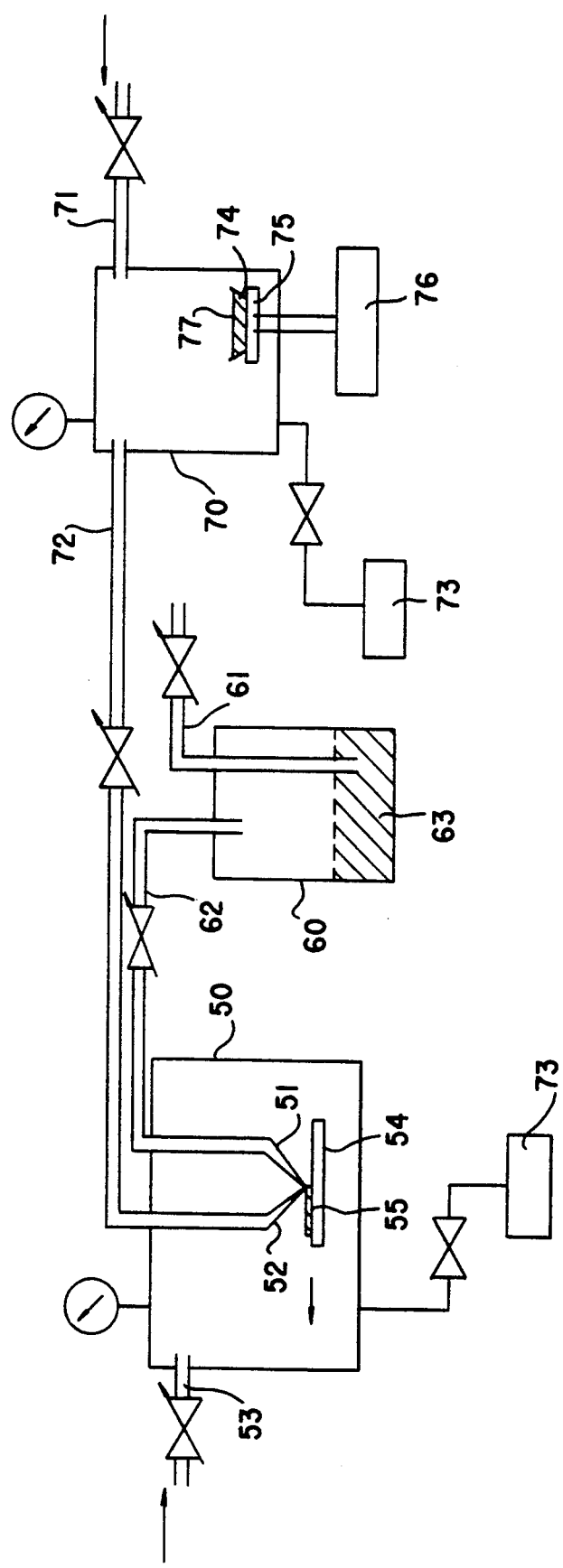
FIG. 7 is a schematic view showing a fundamental composition of a manufacturing device for use in embodiments 7 and 8.

FIG. 7 is the schematic view of a manufacturing device. In the figure, 50 is a spray chamber, 60 is an aerosol container, 70 is an evaporation chamber, 71 is a lead-in pipe for leading in carrier gas, 72 is a delivery pipe, 73 is a pump, 74 is a crucible, 75 is a heater, 76 is a heater power supply, 61 is a lead-in pipe for leading in carrier gas, 62 is a delivery pipe, 51 is a first nozzle at the tip end of the delivery pipe 62, 52 is a second nozzle at the tip end of the delivery pipe 72, 53 is a gas lead -in pipe, and 54 is a substrate. Tip end sizes of the both nozzles 51 and 52 are 0.8 mm × 10 mm. The both nozzles 51 and 52 are so installed as to blow gas onto the same spot of the substrate.

First, 10 weight parts of spinel related lithium manganese dioxide compound including ultra fine particles having a size of 0.1 to 0.3 microns were mixed with 1 weight part of acetylene black uniformly, and then thrown into the aerosol container 60. On the other hand, commercial metallic lithium was placed in the crucible 74 installed in the evaporation chamber 70. Secondly, helium gas was led from the lead-in pipe 61 into the aerosol container 60, ultra fine particles 63 were carried by helium gas to be led through the delivery pipe 62 to the first nozzle 51, and then blown onto the surface of the substrate 54. At the same time, lithium 77 on the crucible 74 was converted into vapor by being heated, molten and vaporized in the heater 75. Ultra fine particles of lithium composed of the vapor condensing to sizes of 0.1 to 0.3 microns were carried by helium gas, which were led from the lead-in pipe 71, to be led through the delivery pipe 72 to the second nozzle 52, and then blown onto the surface of the substrate 54. A quantity of ultra fine particles blown in this instance from the both nozzles 51 and 52 was regulated by adjusting pressures in the aerosol container 60 and the evaporation chamber 70. Thereby, a rigid deposit 55 having a width of 10 mm, a length of 10 mm and a thickness of 100 microns was formed on the surface of the substrate 54. This deposit 55 was taken out into an atmosphere of inert gas and its characteristic for an electrode was examined. Observation was also made by using a scanning electron microscope.

Further, the obtained deposit 55 was immersed in a solution (liquid electrolyte) in which lithium perchlorate was dissolved in a solvent made by mixing propylene carbonate with dimethoxyethane in the same volume, for one hour. Then it was taken out and rinsed with pure dimethoxyethane, and its chemical composition analysis was carried out. The analysis proved that its component could be expressed by a chemical formula of $Li_{1.9}Mn_2O_4$.

Figure 8:
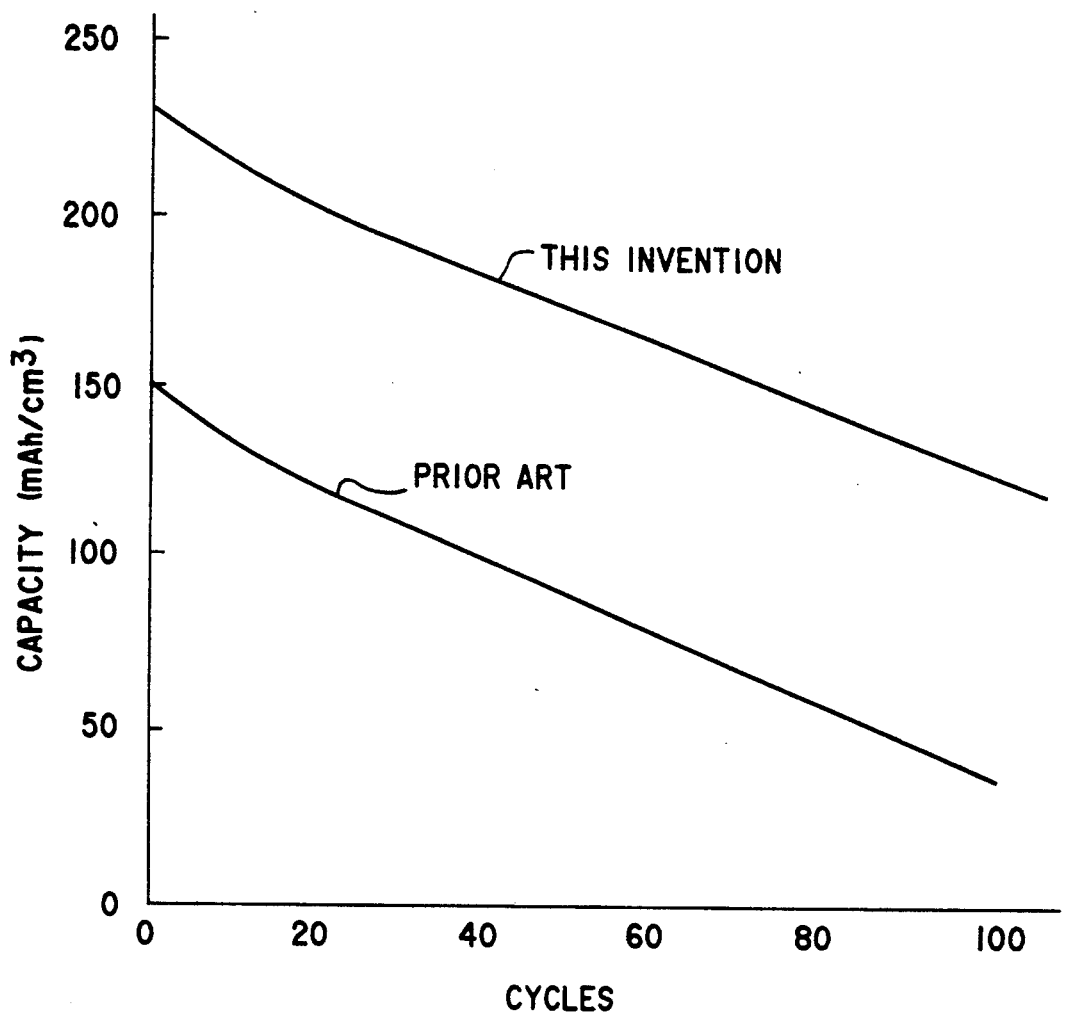
FIG. 8 is a view showing results of a charge/discharge cycle test for electrodes of this invention and the prior art in the embodiment 4.

Using the deposit 55 thus obtained as the cathode and metal lithium as the anode, a simple electro-chemical cell (abbreviated to "invention" hereunder) was assembled by using a liquid electrolyte in which lithium perchlorate was dissolved in the solvent of propylene carbonate mixed with dimethoxyethane in the same volume. The invention developed a voltage of 1.92 V. On the other hand, a simple electro-chemical cell (abbreviated to "prior art" hereunder) was assembled for comparison, by using an electrode which had been obtained by previously electro-chemically deoxidizing a sheeted material utilizing polytetrafluoro-ethylene as a binder up to $Li_2Mn_2O_4$ with lithium, as the cathode and by using the anode and electrolyte identical with the invention. Charge/discharge cycle test was conducted on the invention and the prior art with a current density of 0.1 $mA/cm^2$ per area of cathode. Results are shown in FIG. 8. Charge/discharge end voltage was set to 3.5 V maximum and 2.0 V minimum. A discharging capacity per volume measured from a first cycle's discharging capacity was 230 mAh/g for this invention and 150 mAh/g for the prior art. As seen from this value, the electrode of this invention is one having a very high volume energy density.

The anode of this invention has a composition and structure corresponding to the state of discharging end which can not be obtained by the ordinary sheeting method, and requires no binder. Accordingly, the above-mentioned method for manufacturing the anode of invention is of the dry type and pure. In case when a carbon material capable of doping the lithium is used as the anode, the assembly process of the battery can be simplified because it is not necessary to previously dope the lithium to the anode.

According to the foregoing manufacturing method as described above, the ultra thin plate for lithium battery having an excellent volume efficiency and an uniform thickness can be obtained with good productivity, and the assembly process of battery can be simplified. Further, an electrode having a voluntary porosity can be produced by continuously adjusting the blowing velocity of the active material.

The same effect as in the above embodiment will be accomplished even when a vanadium compound or a manganese compound is used in place of the spinel related lithium manganese dioxide compound.

Embodiment 8

This embodiment relates to a manufacturing method for an anode for a lithium battery.

In FIG. 7, pitch related carbon material in a form of ultra fine particles having sizes of 0.1 to 0.3 microns was placed in the aerosol container 60 and a commercial metal lithium was placed in the crucible 74, and the same operations as in the embodiment 7 were carried out. Thereby, black or gray deposit i.e. an electrode comprising carbon lithium having a width of 10 mm, a length of 10 mm and a thickness of 100 microns was formed on the surface of the substrate 54. This deposit is rigid because it was obtained by the gas deposition method.

Figure 9:
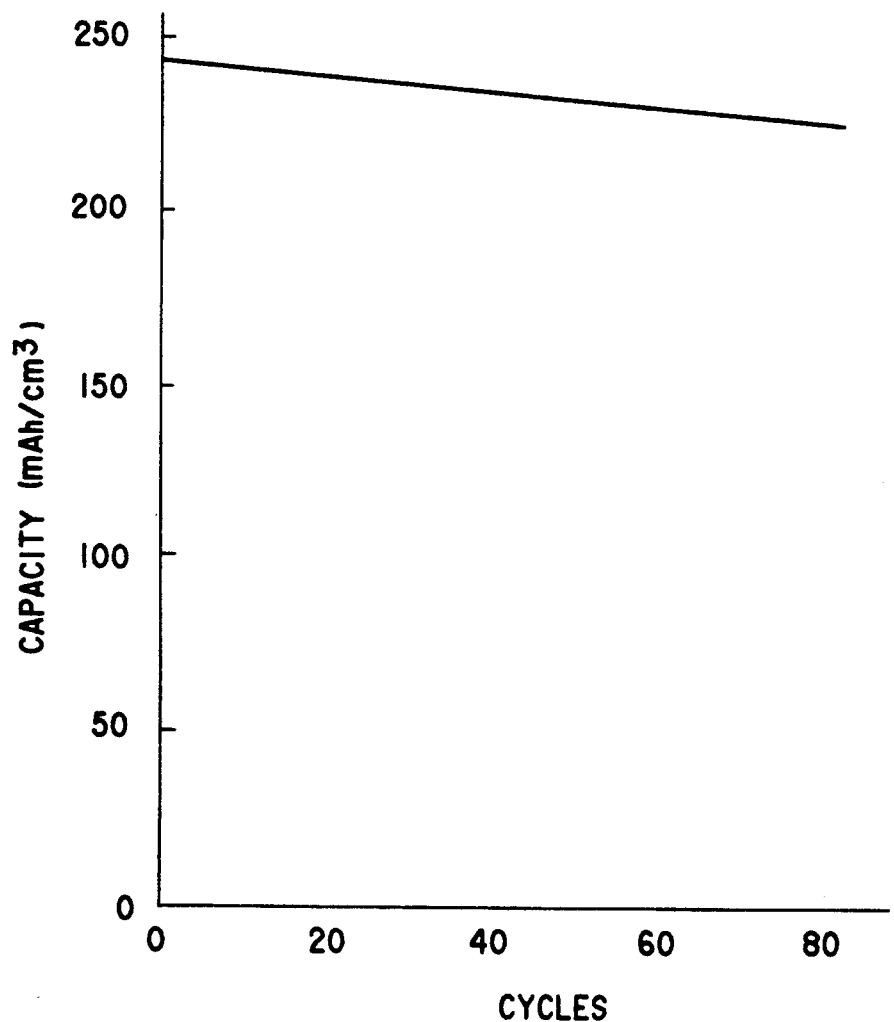
FIG. 9 is a view showing a result of charge/discharge cycle test for an electrode obtained from the embodiment 8.

The electrode thus formed was taken out in an atmosphere of inert gas and its weight was measured. Then, a part of it was subjected to the chemical analysis, and the remainder was utilized for investigation of electrode characteristic. Whether or not a carbon-lithium compound electrode desirable for the battery electrode has been obtained, can be judged firstly by a voltage which is developed by the electrode in an organic electrolyte, and secondly by a quantity of electricity which can take out or take in (de-doping and doping) lithium electro-chemically from or to that electrode in the organic electrolyte. Formed electrode cut out to a size of 1 $cm^2$ was used as a working electrode, a metal lithium was used as a counter electrode, a metal lithium was also used as a reference electrode, and a solution in which lithium arsenate hexafluoride was dissolved in a mixture of propylene-carbonate and ethylene-carbonate, was used as an electrolyte; so that an electro-chemical cell was assembled. A performance of a single battery was evaluated by this cell. A potential difference between the reference electrode and the active electrode was 0.003 V. First, a current was made to flow between the working electrode and the counter electrode (i.e. de-doping) while monitoring an electric potential of the working electrode by the reference electrode, a quantity of electricity until an electric potential of the reference electrode becomes 1.000 V was measured, thereby a capacity of the electrode was measured. The result was 244 mAh/g. Then, a cycle test repeating doping-/dedoping was carried out. The doping was done by connecting the working electrode and counter electrode using a lead wire and allowing the working electrode to stand until its electric potential became 0 V. The de-doping capacity was measured in the same manner as above and its change accompanied by cycle number was measured, and the result as shown in FIG. 9 was obtained. A capacity of 226 mAh/g is maintained at 80 cycles. As the electrode for lithium battery, this result is not inferior to the electrode produced by the sheeting method of the prior art. The electrode capacity was then converted into a value per volume and evaluated. Measurement of electrode thickness was made by observing its section using an electron microscope. A capacity of first was 346 $mAh/cm^3$. Since the capacity for the sheeting method of prior art is 270 to 280 mAh/g, it can be understood that the capacity per volume of the electrode produced by the foregoing method is improved by a large margin.

A volume energy efficiency of the carbon-lithium compound electrode generally has a better volume energy efficiency with a decrease in porocity (an increase in charging density). In order to have it function as the electrode, however, it is required that the material of electrode should properly be in contact with the electrolyte so as to provide efficient occlusion and emission of ions in the electrolyte. When the porosity is too small, an electrode having a good electro-chemical efficiency can not be obtained because the contact area with the electrolyte is limited. Consequently, there exists an optimum value for the porosity. The carbon electrode of the prior art has generally been manufactured by the method sheeting the ultra fine particles of carbon using the binder, and its porosity has been 40 to 60%. According to the above-mentioned method, however, the porosity can be controlled at will. That is, the velocity blowing the ultra fine particles onto the surface of the substrate 54 can be adjusted consecutively by regulating the pressure difference between the evaporation chamber 70 and the spray chamber 50, and the porosity can thus be reduced to approx. 0%.

As described above, the foregoing method is of a dry type and pure because it does not require the use of a binder. Further, the ultra thin lithium battery having an excellent volume efficiency and an uniform thickness can be manufactured by the foregoing method with good productivity. Moreover, its assembly process can also be simplified.

Embodiment 9

This embodiment relates to a manufacturing method for an electrode (cathode)-electrolyte composite.

The same device as in the embodiment 1 was used except that, in the device shown in FIG. 1, a film composed of a solid polymer electrolyte having a thickness of 50 microns was used for the substrate 8 and a high frequency induction heater was used for the heater 3.

The film 8 was manufactured by the well-known cross-linking method. Namely, tri-functional polyether (copolymer of ethylene-oxide with propylene-oxide, molecular weight: 3000), in which 10 weight percent of lithium perchlorate was dissolved, and was cross-linked by using hexamethylene-diisocyanate as a cross-linking agent.

First, in the evaporation chamber 1, a manganese dioxide put in the crucible 2 was converted into vapor by being heated, molten and vaporized in the heater 3 under an atmosphere of helium gas so as to form ultra fine particles of manganese dioxide composed of the vapor condensing to sizes of 0.1 to 0.3 microns. After setting a pressure of helium gas in the evaporation chamber 1 to 100 torr and a pressure in the spray chamber 6 to 0.12 torr, the ultra fine particles of manganese dioxide were carried by helium gas flow to be led to the nozzle 5 through the delivery pipe 5a, and then blown from the nozzle 5 onto a surface of the substrate 8 installed in the spray chamber 6. Thereby, a film of manganese dioxide having a width of 10 mm, a length of 10 mm and a thickness of 10 microns, i.e. a cathode composed of manganese dioxide, was formed on the surface of the substrate 8. That is, a composite of manganese dioxide cathode and solid polymer electrolyte was formed. The film of manganese dioxide is one obtained by the gas deposition method, so that this film is rigid and can not be obtained by an ordinary sheeting method. Further, the above-mentioned method does not require a binder so that it is of a dry type and pure.

Lithium, an anode current collector and an anode current collector were fitted to the obtained electrode-electrolyte composite to compose a battery. Lead wires taken out of both current collectors were connected to an ammeter, and a measured short-circuit current was 14 mA/cm$^2$.

As a comparative embodiment, the following battery was fabricated. A stainless foil was used for the substrate 8 and a cathode composed of manganese dioxide was formed on the surface of the substrate 8 in the same way as above. The solid polymer electrolyte film, lithium and anode current collector (same as above) were fitted to the cathode to compose a battery. Lead wires taken out of the stainless foil and the anode current collector were connected to an ammeter, and a measured short-circuit current was 8 mA/cm$^2$.

According to the above-mentioned method as described above, the electrode-electrolyte composite can be produced with good productivity, which has an excellent adhesion of the electrode with the solid electrolyte. Further, the electrode of ultra thin type with uniform thickness can be produced. Moreover, an electrode having a voluntary porosity can be produced by continuously adjusting the blowing velocity of the active material.

Incidentally, the same effect may be accomplished by using other active materials such as vanadium oxides, molybdenum oxides, cobalt oxides, titanium sulfide, niobium selenide, chromium oxides and molybdenum sulfide etc., in place of the manganese dioxide.

Embodiment 10

This embodiment relates to a manufacturing method for an electrode (anode)-electrolyte composite.

In the device shown in FIG. 1 having the same structure as the embodiment 9, a resistance heater was used for the heater 3 and lithium was put in the crucible 2, and a lithium film having a width of 10 mm, a length of 10 mm and a thickness of 10 microns, i.e. an anode composed of the lithium, was formed on the surface of the film 8 in the same way as the embodiment 9. The film of lithium is one obtained by the gas deposition method, so that this film is rigid and can not be obtained by the ordinary melting, solidifying or rolling method. On the other hand, manganese dioxide was placed in the crucible 2 and a stainless foil was used in place of the film 8, so that the film of manganese dioxide was formed on a surface of the stainless foil in the same way as above. Both were stuck to each other, and the anode current collector was fitted thereto to compose a battery. Lead wires taken out of the stainless foil and the anode current collector were connected to an ammeter, and a measured short-circuit current was 11 mA/cm$^2$.

As a comparative embodiment, the following battery was fabricated. A stainless foil was used for the substrate 8, and a an anode composed of lithium was formed on the surface of the stainless foil in the same way as above. The solid polymer electrolyte film (same as above) and cathode current collector on which the film of manganese dioxide was formed were fitted to the anode to compose a battery. Lead wires taken out of the stainless foil and the cathode current collector were connected to an ammeter, and measured short-circuit current was 8 mA/cm$^2$.

According to the above-mentioned method as described above, the electrode-electrolyte composite can be produced with good productivity, which has an excellent adhesion of the electrode with the solid electrolyte. Further, the electrode of ultra thin type with uniform thickness can be produced. Moreover, an electrode having a voluntary porosity can be produced by continuously adjusting the blowing velocity of the active material.

Incidentally, the same effect may be accomplished by using a lithium alloy in place of the lithium. As for the lithium alloy, there may be one including aluminum. A high frequency induction heater may be used for the heater 3.

Embodiment 11

This embodiment relates to a manufacturing method for an electrode (anode and cathode)-electrolyte composite.

Figure 10:
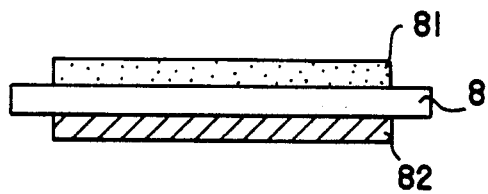
FIG. 10 is a sectional view showing an electrode-electrolyte composite obtained from embodiments 11 and 13.

In the device shown in FIG. 1 having the same structure as the embodiment 9, a manganese dioxide was placed in the crucible 2, and a manganese dioxide film, i.e. a cathode composed of manganese dioxide having a width of 10 mm, a length of 10 mm and a thickness of 10 microns, was formed on the surface of the film 8 in the same way as the embodiment 9. The obtained cathode-electrolyte composite was turned upside down, a lithium was placed in the crucible 2, and the lithium film, i.e. the anode composed of lithium, having a width of 10 mm, a length of 10 mm and a thickness of 10 microns, was formed in the same way as the case of manganese dioxide. Thereby, a composite comprising the cathode, electrolyte and the anode as shown by FIG. 10 was formed. In FIG. 10, 81 is a cathode composed of manganese dioxide, and 82 is an anode composed of lithium. A cathode current collector and an anode current collector were fitted to this composite to compose a battery. Lead wires taken out of both current collectors were connected to an ammeter, and a measured short-circuit current was 16 mA/cm$^2$.

As a comparative embodiment, the following battery was fabricated. A stainless foil was used for the substrate 8, and a cathode composed of manganese dioxide was formed on the surface of the substrate 8 in the same way as above. The solid polymer electrolyte film same as above and an anode current collector on which lithium film was formed were fitted to the cathode to compose a battery. Lead wires taken out of the stainless foil and the anode current collector were connected to an ammeter, and a measured short-circuit current was 8 mA/cm$^2$.

According to the above-mentioned method as described above, the electrode (anode and cathode)-electrolyte composite can be produced with good productivity, which has an excellent adhesion of the electrode with the solid electrolyte. Further, the electrode of ultra thin type with uniform thickness can be produced. Moreover, an electrode having a voluntary porosity can be produced by continuously adjusting the blowing velocity of the active material.

Incidentally, the same effect may be accomplished by using other positive active materials such as vanadium oxides, molybdenum oxides, cobalt oxides, titanium sulfide, niobium selenide, chromium oxides and molybdenum sulfide etc. in place of the manganese dioxide; or by using other negative active materials such as lithium alloy in place of the lithium. As for the lithium alloy, there may be one including aluminum. A high frequency induction heater may be used for the heater 3.

Embodiment 12

This embodiment relates to a manufacturing method for an electrode (cathode)-electrolyte composite, and relates to a method different from that described in the embodiment 9.

In the device shown in FIG. 1 having the same structure as the embodiment 9, manganese was placed in the crucible 2, and the same operations as in the embodiment 9 were carried out in the evaporation chamber 1 under an atmosphere of mixed gas of helium and oxygen. Ultra fine particles of manganese having sizes of 0.1 to 0.3 mm, which were formed in the evaporation chamber 1, reacted with oxygen gas to become ultra fine particles of manganese dioxide, and were then blown onto the surface of the film 8. A film of manganese dioxide, i.e. an cathode composed of manganese dioxide having a width of 10 mm, a length of 10 mm and a thickness of 10 microns, was formed on the surface of the film 8. The film is one formed through deposition of injected ultra fine particles of manganese dioxide, i.e. obtained by means of the gas deposition method, so that this film is rigid and can not be obtained by the ordinary sheeting method. Further, the above-mentioned method does not require a binder so that it is of a dry type and pure.

According to the above-mentioned method as described above, the electrode-electrolyte composite can also be produced with good productivity, which has an excellent adhesion of the electrode with the solid electrolyte. Further, the electrode of ultra thin type with uniform thickness can be produced. Moreover, an electrode having a voluntary porosity can be produced by continuously adjusting the blowing velocity of the active material.

Incidentally, when vanadium, molybdenum, titanium, cobalt, chromium etc. are used in place of the manganese, a composite of the electrolyte and the cathode composed of active material which is a dioxide of the above materials can be obtained.

Embodiment 13

This embodiment relates to a manufacturing method for an electrode-electrolyte composite on an electrode surface of which a metal film is formed.

In the device shown in FIG. 1 having the same structure as in the embodiment 11, a composite (FIG. 10) composed of the manganese dioxide cathode, the electrolyte and the lithium anode which is the same as the embodiment 11 was formed in the same way as the embodiment 11. Then, nickel was placed in the crucible 2 and converted into vapor by being heated, molten and vaporized in the heater 3 to form ultra fine particles of nickel. The ultra fine particles of nickel were blown onto the surface of the lithium anode 82 of the foregoing composite to form a nickel film on the surface of the lithium anode 82. Thereafter, the above-mentioned composite was turned upside down to form a nickel film on the surface of the manganese dioxide cathode 81 in the same way as above. The thus obtained composite composed of the nickel, the manganese dioxide cathode, the electrolyte, the lithium anode and the nickel composes a battery of itself. Since the surface of the electrode is covered by the nickel in this battery, it does not become defective due to moisture even if it is exposed to atmosphere, and the effective contact area between the electrode and the packaging material forming current collector can be maintained well. In the above-mentioned battery, lead wires taken out of the both nickel films were connected to an ammeter, and measured short-circuit current was 23 mA/cm$^2$.

As a comparative embodiment, the following battery was fabricated. A stainless foil was used in place of the film 8, and a cathode composed of manganese dioxide was formed on the surface of the stainless foil in the same way as above. The solid polymer electrolyte film (same as above) and an anode current collector on which the lithium film was formed were fitted to the cathode to compose a battery. Lead wires taken out of the stainless foil and the anode current collector were connected to an ammeter, and a measured short-circuit current was 8 mA/cm$^2$.

According to the above-mentioned method as described above, the electrode (anode and cathode)-electrolyte composite can be produced with good productivity, which has an excellent adhesion of the electrode with the solid electrolyte, has a preferable adhesion with the packaging material, and is hardly affected by moisture in atmosphere. Further, an electrode of ultra thin type having an uniform thickness can be produced. Moreover, an electrode having a voluntary porosity can be produced by continuously adjusting the blowing velocity of the active material.

Incidentally, this method is applicable not only to the case where the nickel film is formed on both surfaces of the film 8, but to a case where it is formed on only one surface of the film 8. The same effect may be accomplished by using other positive active materials such as vanadium oxides, molybdenum oxides, cobalt oxides, titanium sulfide, niobium selenide, chromium oxides and molybdenum sulfide etc. in place of the manganese dioxide, or by using other negative active materials such as a lithium alloy in place of the lithium.

What is claimed is:

1. In a method for manufacturing an electrode comprising a film on a substrate, the improvement comprising:
    forming ultra fine particles of active material, selected from the group consisting of lithium and lithium alloy, in an inert gas by an evaporation method;
    carrying said particles in an inert gas flow to be flown onto a surface of a substrate; and
    blowing the particles carried by the inert gas flow onto the surface of the substrate, thereby depositing said particles carried in the inert gas flow onto the surface of the substrate, thereby forming an electrode comprising a thin film of said active material on the surface of said substrate.

2. In a method for manufacturing an electrode comprising a film on a substrate, the improvement comprising:
    forming ultra fine particles of pure metal, selected from the group consisting of manganese, vanadium, molybdenum, titanium, cobalt and chrome, in a first gas of inert gas and oxygen by an evaporation method;
    reacting said ultra fine particles of pure metal with a reaction gas of oxygen mixed with said first gas, thereby forming ultra fine particles of active material; and
    carrying said ultra fine particles of active material by a gas flow of inert gas and oxygen to be blown onto a surface of a substrate; and
    blowing the particles carried by the inert gas flow onto the surface of the substrate, thereby depositing said ultra fine particles of active material carried in said gas flow onto the surface of the substrate, thereby forming an electrode comprising a thin film of active material on the surface of said substrate.

3. In a method for manufacturing an electrode comprising a film on a substrate, the improvement comprising:
    carrying ultra fine particles of carbon material as a negative active material in an inert gas flow to be blown onto a surface of a substrate; and
    blowing the ultra fine particles of carbon material carried by the inert gas flow onto the surface of the substrate, thereby depositing said ultra fine particles of carbon material carried in the inert gas flow onto the surface of the substrate, thereby forming a carbon electrode comprising a thin film of carbon material on the surface of the substrate.

4. A method according to claim 3, wherein the carbon material is selected from the group consisting of carbon, graphite and acetylene black.

5. A method according to claim 3, wherein a carbon thin crystal in the thin film has a pseudo-graphite structure with a spacing of over 3.3 Angstroms inclusive.

6. A method according to claim 3, wherein a carbon crystal in the thin film has a pseudo-graphite structure with a spacing of 3.4 to 3.5 Angstroms.

7. A method according to claim 3, wherein a carbon crystal in the thin film has a pseudo-graphite structure with a spacing of 3.42 to 3.47 Angstroms.

8. A method according to claim 3, wherein a carbon crystal in the thin film has a size of 10 to 1000 angstroms.

9. In a method for manufacturing an electrode comprising a film on a substrate, the improvement comprising:
    forming ultra fine particles of a plurality of metals in an inert gas by an evaporation method, said plurality of metals comprising at least two metals selected from the group consisting of manganese, cobalt, nickel, zinc, tin, lead, lithium, molybdenum, vanadium, chrome, iron, ruthenium, osmium, tungsten, copper and silver;
    carrying said ultra fine particles in an inert gas flow to be blown onto a surface of a substrate;
    blowing the ultra fine particles carried by the inert gas flow onto the surface of the substrate, thereby depositing the ultra fine particles carried in the inert gas flow onto the surface of the substrate to form a thin film; and
    reacting said thin film with oxygen while said thin film is heated, thereby forming an active material of a multi-component system such that an electrode is formed comprising a thin film of said active material on the surface of said substrate.

10. In a method for manufacturing an electrode comprising a film on a substrate, the improvement comprising:
    forming fine particles of a plurality of metals in an inert gas by an evaporation method, said plurality of metals comprising at least two metals selected from the group consisting of manganese, cobalt, nickel, zinc, tin, lead, lithium, molybdenum, vanadium, chrome, iron, ruthenium, osmium, tungsten, copper and silver;
    reacting said ultra fine particles with oxygen mixed in the inert gas to form ultra fine particles of active material to be blown onto a surface of a substrate; and
    blowing the ultra fine particles of active material onto the surface of the substrate, thereby depositing said ultra fine particles of active material onto the surface of the substrate, thereby forming an electrode comprising a thin film of active material of a multi-component system on the surface of the substrate.

11. In a method for manufacturing an electrode comprising a film on a substrate, the improvement comprising:
    carrying ultra fine particles of a metallic compound and ultra fine particles of lithium in respective inert gas flows to be blown onto a surface of the substrate; and
    blowing the ultra fine particles carried in the respective inert gas flows onto the surface of the substrate, thereby depositing said particles carried in said respective inert gas flows simultaneously onto the surface of the substrate, thereby forming an anode for a lithium battery on the surface of the substrate.

12. In a method for manufacturing an electrode comprising a film on a substrate, the improvement comprising:

carrying ultra fine particles of a metallic compound and ultra fine particles of lithium in respective inert gas flows to be blown onto a surface of the substrate;

blowing the particles carried in said respective inert gas flows onto the surface of the substrate, thereby depositing said particles carried in said respective inert gas flows simultaneously onto the surface of the substrate;

immersing said deposited particles in a liquid electrolyte; and electro-chemically reacting said deposited particles and said liquid electrolyte, so that an anode for a lithium battery is formed on the surface of the substrate.

13. A method according to claim 11 or 12, wherein the cathode for the lithium battery comprises a lithium reductant.

14. A method according to claim 11 or 12, wherein the metallic compound is selected from the group consisting of spinel related lithium manganese oxide compound, vanadium compound and manganese compound.

15. In a method for manufacturing an electrode comprising a film on a substrate, the improvement comprising:

carrying ultra fine particles of carbon material and ultra fine particles of lithium in respective inert gas flows to be blown onto a surface of the substrate;

blowing the particles carried by the respective inert gas flows onto the surface of the substrate, thereby depositing said particles carried in said respective inert gas flows simultaneously onto the surface of the substrate, so that an anode is formed for a lithium battery comprising a carbon-lithium compound on the surface of the substrate.

16. In a method for manufacturing an electrode-electrolyte composite comprising an electrode and an electrolyte, the improvement comprising:

forming ultra fine particles of active material in an inert gas by an evaporation method;

carrying said particles in an inert gas flow to be blown onto a surface of a film comprising a solid electrolyte;

blowing said particles carried in the inert gas flow onto the surface of the film comprising the solid electrolyte, thereby depositing the particles carried in the inert gas flow onto the surface of the film comprising the solid electrolyte, thereby forming an electrode comprising a thin film of active material on the surface of the film comprising the solid electrolyte.

17. A method according to claim 16, wherein the solid electrolyte is a solid polymer electrolyte.

18. A method according to claim 16, wherein the active material is selected from the group consisting of manganese oxides, vanadium oxides, molybdenum oxides, cobalt oxides, titanium sulfide, niobium selenide, chrome oxides and molybdenum sulfide.

19. A method according to claim 16, wherein the active material is selected from the group consisting of lithium and lithium alloy.

20. A method according to claim 19, wherein the lithium alloy includes aluminum.

21. In a method for manufacturing an electrode-electrolyte composite comprising an electrode and an electrolyte, the improvement comprising:

forming ultra fine particles of active material in an inert gas by an evaporation method;

carrying said particles in an inert gas flow to be blown onto a surface of a film comprising a solid electrolyte;

blowing the particles carried in the inert gas flow onto the surface of the film comprising the solid electrolyte, thereby depositing said particles carried in the inert gas flow onto the surface of the film comprising the solid electrolyte, thereby forming an electrode comprising a thin film of active material on the surface of the film comprising the solid electrolyte; and a positive active material is deposited onto one surface of the film comprising the solid electrolyte and a negative active material is deposited onto the other surface thereof.

22. A method according to claim 21, wherein the solid electrolyte is a solid polymer electrolyte.

23. A method according to claim 21, wherein the positive active material is selected from the group consisting of manganese oxides, vanadium oxides, molybdenum oxides, cobalt oxides, titanium sulfide, niobium selenide, chrome oxides and molybdenum sulfide.

24. A method according to claim 21, wherein the negative active material is selected from the group consisting of lithium and lithium alloy.

25. A method according to claim 24, wherein the lithium alloy includes aluminum.

26. In a method for manufacturing an electrode-electrolyte composite comprising an electrode and an electrolyte, the improvement comprising:

forming ultra fine particles of pure metal in a mixed gas of inert gas and oxygen by an evaporation method;

reacting said particles with a reaction gas of oxygen mixed with the mixed gas, thereby forming ultra fine particles of active material;

carrying said ultra fine particles of the active material in a gas flow of inert gas and oxygen to be blown onto a surface of a film comprising a solid electrolyte; and blowing the ultra fine particles of active material carried in the inert gas flow onto the surface of the film comprising said electrolyte, thereby depositing the ultra fine particles of active material carried int he gas flow onto the surface of the film comprising the solid electrolyte, thereby forming an electrode comprising a thin film of active material on the surface of the film comprising the solid electrolyte.

27. A method according to claim 26, wherein the pure metal selected from the group consisting of manganese, vanadium, molybdenum, titanium, cobalt and chrome; and the reaction gas is oxygen.

28. In a method for manufacturing an electrode-electrolyte composite comprising an electrode and an electrolyte, comprising:

forming ultra fine particles of active material in an inert gas by an evaporation method;

carrying said ultra fine particles of active material in a first inert gas flow to be blown onto a surface of a film comprising a solid electrolyte;

blowing the particles carried in the first inert gas flow onto the surface of the film comprising the solid electrolyte, thereby depositing said particles carried int he first inert gas flow onto the surface of the film comprising the solid electrolyte, thereby forming an electrode comprising a thin film of active material on the surface of the film comprising the solid electrolyte;

forming ultra fine particles of a metal different from the active material by the evaporation method;

carrying said ultra fine particles of said different metal in a second inert gas flow to be blown onto said thin film of active material; and blowing the particles carried by the second inert gas flow onto the thin film of active material, thereby depositing the ultra fine particles carried in the second inert gas flow onto said thin film of active material so that a metal film is formed on the surface of the electrode.

29. A method according to claim 28, wherein the solid electrolyte is a solid polymer electrolyte.

30. A method according to claim 28, wherein the active material is selected from the group consisting of manganese oxides, vanadium oxides, molybdenum oxides, cobalt oxides, titanium sulfide, niobium selenide, chrome oxides and molybdenum sulfide.

31. A method according to claim 28, wherein the active material is selected from the group consisting of lithium and lithium alloy.

32. In a method for manufacturing an electrode-electrolyte composite comprising an electrode and an electrolyte, the improvement comprising:

forming ultra fine particles of active material in an inert gas by an evaporation method;

carrying said particles in a first inert gas flow to be blown onto a surface of a film comprising a solid electrolyte;

blowing the particles carried by the first inert gas flow onto the surface of the film comprising the solid electrolyte, thereby depositing the particles carried in the first inert gas flow onto the surface of the film comprising the solid electrolyte, thereby forming an electrode comprising a thin film of active material on the surface of said film comprising the solid electrolyte;

forming ultra fine particles of a metal different from the active material by the evaporation method;

carrying said particles of a different metal in a second inert gas flow to be blown onto a surface of the electrode;

blowing the particles of the different metal carried in the second inert gas flow onto the surface of the electrode comprising the thin film of active material, thereby depositing said particles of the different metal carried in said second inert gas flow onto the surface of the electrode comprising the thin film of active material so that a metal film is formed on the surface of the electrode; wherein a positive active material is deposited on one surface of the film comprising the solid electrolyte and a negative active material is deposited on the other surface of the film comprising the solid electrolyte.

33. A method according to claim 32, wherein the solid electrolyte is a solid polymer electrolyte.

34. A method according to claim 32, wherein the positive active material is selected from the group consisting of manganese oxides, vanadium oxides, molybdenum oxides, cobalt oxides, titanium sulfide, niobium selenide, chrome oxides and molybdenum sulfide.

35. A method according to claim 32, wherein the negative active material is selected from the group consisting of lithium and lithium alloy.

* * * * *

UNITED STATES PATENT AND TRADEMARK OFFICE
CERTIFICATE OF CORRECTION

PATENT NO.:   5,290,592
DATED    :   March 1, 1994
INVENTOR(S):   IZUCHI et al.

It is certified that error appears in the above-identified patent and that said Letters Patent is hereby corrected as shown below:

On the cover page, Item [73], "Yuasa Battery Co., Ltd." should read --Yuasa Corporation--.

Signed and Sealed this

Thirty-first Day of May, 1994

Attest:

BRUCE LEHMAN

*Attesting Officer*   *Commissioner of Patents and Trademarks*